United States Patent [19]

Zeegers et al.

[11] Patent Number: 5,806,035

[45] Date of Patent: Sep. 8, 1998

[54] TRAFFIC INFORMATION APPARATUS SYNTHESIZING VOICE MESSAGES BY INTERPRETING SPOKEN ELEMENT CODE TYPE IDENTIFIERS AND CODES IN MESSAGE REPRESENTATION

[75] Inventors: Donald Zeegers, Waalre, Netherlands; Jean-Louis Zorer, Coulombs, France

[73] Assignee: U.S. Philips Corporation, New York, N.Y.

[21] Appl. No.: 637,249

[22] Filed: Apr. 24, 1996

[30] Foreign Application Priority Data

May 17, 1995 [FR] France .................................. 95 05863

[51] Int. Cl.$^6$ ................................ G10L 5/02; G08B 3/10
[52] U.S. Cl. .......................... 704/258; 704/270; 701/201
[58] Field of Search .................................. 395/2.67, 2.79; 340/905; 364/423.098, 444.1; 704/258, 270; 701/201

[56] References Cited

U.S. PATENT DOCUMENTS

| | | | |
|---|---|---|---|
| 5,276,909 | 1/1994 | Milner et al. ........................... | 455/38.5 |
| 5,635,924 | 6/1997 | Tran et al. ............................... | 340/905 |

FOREIGN PATENT DOCUMENTS

| | | | |
|---|---|---|---|
| 0059880A2 | 9/1982 | European Pat. Off. .......... | G10L 1/08 |
| 0454572A1 | 10/1991 | European Pat. Off. ......... | G08D 3/10 |
| 0495252A1 | 7/1992 | European Pat. Off. ....... | G06K 19/07 |
| 03912945 A1 | 10/1990 | Germany . | |
| 04142091 | 8/1993 | Germany . | |

*Primary Examiner*—David R. Hudspeth
*Assistant Examiner*—Tālivaldis Ivars Šmits

[57] ABSTRACT

The speech synthesizer generates signals for a loudspeaker on the basis of symbols defining the words to be reproduced.

In accordance with the invention, the same speech synthesizer is provided with means for processing symbols of three different types, i.e.:

a type representing phonetically the elements of a word to be reproduced, or a type formed by a number designating a quantity or the designation of a major route, or a type formed by a number designating a sequence prestored in a memory of the speech synthesizer and corresponding to a phrase part.

A series of symbols arriving at the speech synthesizer comprises successive sequences of symbols which are arranged end to end, said sequences being of three types, a type recognition character ($, |, ^) being placed at each end of a sequence of a given type.

16 Claims, 1 Drawing Sheet

TRAFFIC INFORMATION APPARATUS SYNTHESIZING VOICE MESSAGES BY INTERPRETING SPOKEN ELEMENT CODE TYPE IDENTIFIERS AND CODES IN MESSAGE REPRESENTATION

The present invention relates to a traffic information apparatus, comprising a speech synthesizer which generates spoken messages in the form of analog signals for a loudspeaker, means for the acquisition of codes representing a respective message element, a permanent memory in which there are stored data representing message elements, each of which is formed by a sequence of symbols representing the phonetic transcription of the message element, corresponding to a respective one of said codes, and a microcontroller which comprises means for interpreting said codes so as to find the corresponding message elements in the memory and to supply the speech synthesizer with a sequence of symbols representing the phonetic transcription of the message element.

An apparatus of this kind is, for example a car radio receiver for receiving, via broadcasting, so-called RDS/TMC signals containing traffic information messages, or a vehicle navigation apparatus which extracts messages inter alia from a compact disc. An apparatus of this kind supplies information messages regarding traffic, or intended for the navigation of a vehicle, by speech synthesis and by displaying the messages, if desired, on a screen.

A speech synthesizer is known from the document EP-A-0 059 880. This document explains that spoken messages are defined by elements, which are referred to as allophones and each of which represents the phonetic transcription of a vocabulary element, said allophones being applied to the speech synthesizer.

It is an object of the invention to simplify the overall construction of the assembly formed by the microcontroller and the speech synthesizer.

To this end, the traffic information apparatus in accordance with the invention is characterized in that the permanent memory also contains data representing message elements of at least one type which differs from that of said data representing message elements and contains for each of these data an indication of its type, the microcontroller comprising means for fetching from the memory, by means of a code representing a message element, the relevant data which are of one type or another, for placing ahead of each data a type recognition character corresponding to the type, and for applying the data to the speech synthesizer which comprises means for recognizing the type recognition characters and for transforming the different types of corresponding data into analog signals for a loudspeaker.

The microcontroller software can thus be considerably simplified without making that of the speech synthesizer substantially more complex.

In a specific embodiment, data of a different type are formed by numbers, each of them designating a prestored sequence in a memory of the speech synthesizer, which sequence corresponds to a phrase part, while the speech synthesizer comprises means for transforming the relevant sequence into analog signals for a loudspeaker.

In another specific embodiment, data of a different type are formed by numbers, each designating a quantity or the designation of a major route while the speech synthesizer comprises means for transforming the relevant quantity or designation into analog signals for a loudspeaker.

The memory preferably contains, in addition to phonetic symbols, at the same time data in conformity with either of the above two embodiments while the speech synthesizer comprises means for recognizing at least three type recognition characters and for transforming the corresponding different types of data into analog signals for a loudspeaker.

For the transmission of a complete message to the speech synthesizer, data of different types are preferably transmitted one after the other during a single data transfer via a serial bus, for example a bus of the I2C type. This enables the use of a serial microcontroller port and limits the number of internal connections of the apparatus.

The microcontroller preferably comprises means for placing behind respective data a type recognition character which is identical to that preceding the data.

A symbol which is identical to the recognition character of another type can thus be used in respective data of a given type without risk of confusion.

These and other aspects of the invention will be apparent from and elucidated with reference to the embodiments described hereinafter.

The following description relates to a car radio which is intended to receive and utilize so-called RDS/TMC signals. It will be evident to those skilled in the art that this description can be adapted to the case of a navigation or road guidance apparatus, for example of the type known as "CARIN" or "CARMINAT" or "SOCRATES", and also that the part in which the invention is implemented may be similar in a car radio and a navigation apparatus.

Figure 1:
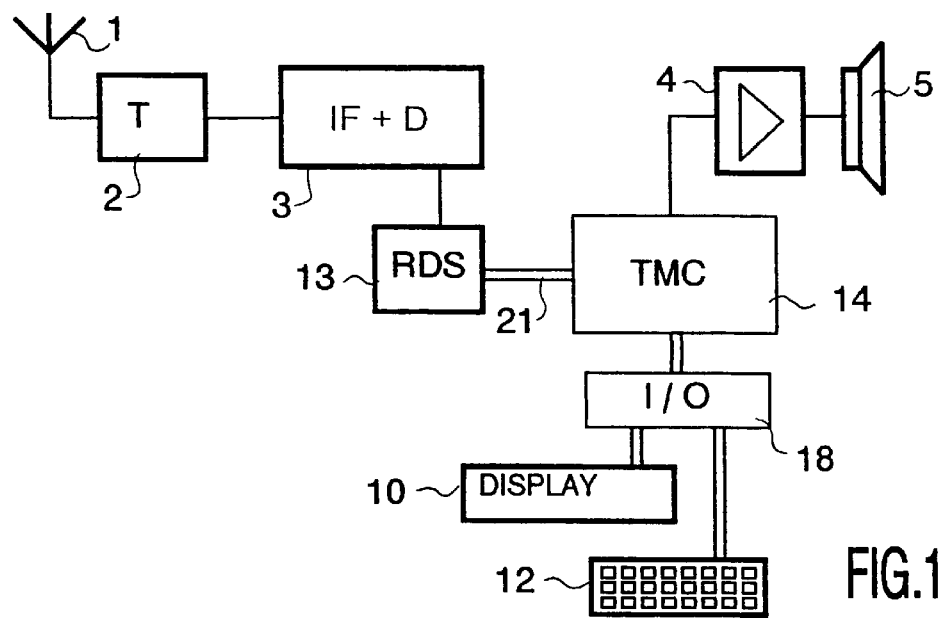
FIG. 1 shows diagrammatically a car radio receiver in accordance with the invention.

Subsequent to an aerial 1, the receiver shown in FIG. 1 comprises a device 2 (tuner) which comprises a tuning circuit and a frequency control circuit, followed by a device 3 which comprises an intermediate frequency amplifier and a demodulator.

In the so-called RDS (Radio Data System) process an FM subcarrier is modulated by digital data signals for the reception of various stations of the same network. For the processing of these signals the receiver comprises a decoder 13 for RDS messages.

In the case of the so-called TMC (Traffic Message Channel) process information messages concerning traffic are incorporated in given digital fields of RDS signals.

For the processing of the TMC messages the receiver comprises a module 14 whereto the RDS data from the decoder 13 are applied, via a bus 21, so as to be analysed and possibly stored. In order to enable output of the messages in the form of speech, the module 14 is also connected to an audio amplifier system 4 which is succeeded by a loudspeaker 5. It is also connected to an input/output interface device 18 which is connected to a control keyboard 12 and to a display screen 10, for example a liquid crystal display screen.

The standard TMC messages are formed by several digital data fields, received in the RDS data, which designate message elements by way of a number:

a first field, comprising 11 bits, which contains a number which designates a message element (word or group of words) describing an event, a second field, comprising 16 bits, which contains a number which designates a message element which defines the location whereto the relevant event relates, a third field, comprising 3 bits, which contains data describing an extension of the location concerned, a fourth field, comprising 1 bit, which describes the direction of the route concerned, a fifth field, comprising 3 bits, which provides the duration of the validity of the message, a sixth field, comprising 1 bit, which indicates whether or not it is recommended to take a detour.

The contents of each field must be processed so as to express in plain form what is concerned. To this end, there is provided a permanent memory in which information which enables the corresponding message elements to be generated for a message to be displayed is stored at addresses corresponding to the different possible contents of each field, thus enabling the retrieval of the information on the basis of the contents of a field.

For example, the first field, comprising 11 bits, is associated with a memory which can contain $2^{11}$ message elements in plain form, each element being found at the address defined by the contents of the field. These message elements say, for example "traffic jam", "roadwork ahead", "accident", etc.

The second field, comprising 16 bits, is associated with a memory which may contain as many as $2^{16}$ message elements in plain form, comprising complete data concerning notably place names, their type, the region in which they are situated, the next and preceding points, etc. These message elements are, for example "Paris" or "Lille", etc. Several data fields are provided for the same location if it forms part of several routes; for example, "Compiégne", situated on the route Paris-Lille but also on the route Rouen-Reims, occurs separately for each of these routes. For each country concerned there are defined several different databases of $2^{16}$ elements each for selection in conformity with the application. The country concerned is indicated in a so-called PI code, forming part of the RDS data, and the reference of the database chosen is indicated in a "system message" emitted from time to time, by every RDS/TMC transmitter.

In the third field, various types of extensions are defined. An extension is to be understood to mean that the event considered extends, for example as far as the next location or over two kilometres, etc.

In the fourth field a 0 bit signifies, for example "direction Paris→Lille", whereas a 1 bit signifies "direction Lille→Paris" (the contents of field 2 reveal that a link between Paris and Lille is concerned, but the direction still fails).

A set of these fields thus enables, for example a message to be defined such as "motorway A1 to Lille: traffic jam over two kilometres at the area of Compiégne".

Figure 2:
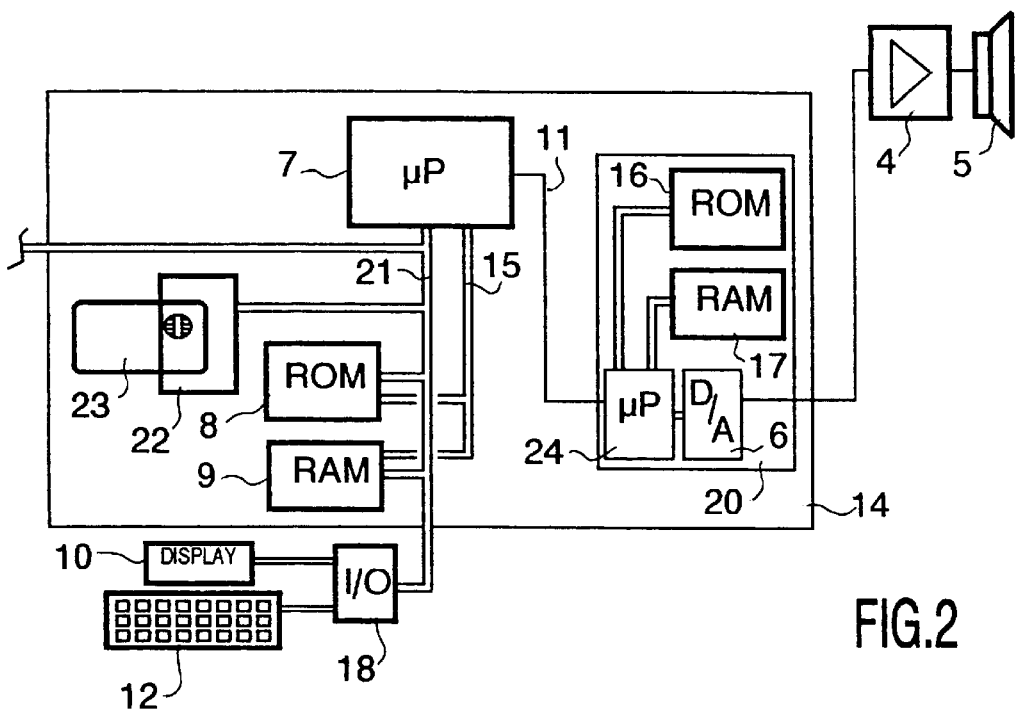
FIG. 2 is a more detailed representation of the speech synthesizer and its connections to the remainder of the apparatus.

Referring to FIG. 2, the module 14 comprises a microcontroller 7, for example of the type 68000, which generates control signals and processes the signals output by various devices 8, 9, 18, 22 whereto it is connected by way of an address bus 15 and a data bus 21. The module 14 comprises several memories:

a volatile memory which is a so-called "RAM" for the storage of data valid at a given instant, a permanent memory 8 for storing data concerning message elements, said data being fixed once and for all in correspondence with given fields, and instructions indicating how the message elements should be processed in conformity with their meaning as will be explained further on, and a memory 22, 23 which is formed by a memory card reader 22 and a removable memory card 23, for example of the type PCMCIA, in which notably the data corresponding to the second TMC data field are stored, i.e. inter alia the sequence of phonemes corresponding to each of the location names for a given country (it will be recalled that a phoneme is a unit of sound of a language). These data are thus provided for a given group of users and/or a given region.

The microcontroller 7 selects and prepares data as a function of the contents of the TMC message. When a TMC message arrives, the microcontroller receives from the RDS decoder 13 the contents of fields and writes these contents in the memory 9. For the transmission of this message in the form of speech it finds in the memory 8, in correspondence with the number contained in a field, an address which leads to a sub-routine conceived to process the relevant message element, i.e. to generate a series of symbols for a speech synthesizer 20.

A series of symbols arriving at the speech synthesizer comprises successive sequences of symbols which are placed end to end, at each side of a sequence of a given type there being placed a type recognition character. The present example involves three different types of symbol sequences.

A sequence of symbols of a first type phonetically represents the elements of a word to be reproduced.

A sequence of symbols of a second type is formed by a number which designates a quantity or the designation of a major route.

A sequence of symbols of a third type is formed by a number which designates a prestored sequence in the memory of the speech synthesizer which corresponds to a phrase part.

Figure 3:
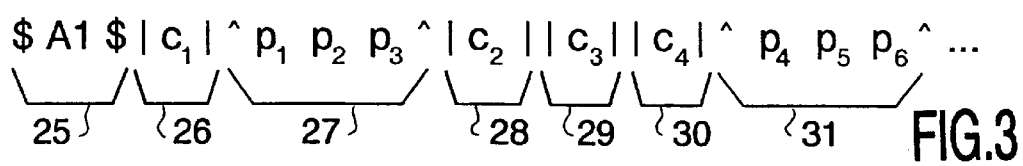
FIG. 3 shows an example of a series of symbol sequences produced by the microcontroller for the speech synthesizer, comprising symbols of three types in a mixed fashion.

Thus, the sequence of symbols shown in FIG. 3 comprises end to end:

a sequence of symbols 25 of the second type which commences and finishes by way of the character $ and designates the motorway A1, a sequence of symbols 26 of the third type which commences and finishes by way of the character | and comprises a single symbol $c_1$ which leads to a prestored sequence in a permanent memory of the speech synthesizer module, corresponding to the generating of the word "to" in the loudspeaker, a sequence of symbols 27 of the first type which commences and finishes by way of the character ^ and comprises the phonetic elements $p_1$, $P_2$, $P_3$ which define the pronunciation of the location name "Lille", a sequence of symbols 28 of the third type which commences and finishes by way of the character | and comprises a single symbol $c_2$ which leads to a prestored sequence in a permanent memory of the speech synthesizer module, corresponding to the generating of the words "traffic jam", a sequence of symbols 29 of the third type which commences and finishes by way of the character | and comprises a single symbol $C_3$ leading to a prestored sequence in a permanent memory of the speech synthesizer module, corresponding to the generating of the words "over two kilometres", a sequence of symbols 30 of the third type which commences and finishes by way of the character | and comprises a single symbol $c_4$ leading to a prestored sequence in a permanent memory of the speech synthesizer module, corresponding to the generating of the words "at the area of", a sequence of symbols 31 of the first type which commences and finishes by way of the character ^ and comprises the phonetic elements $p_4$, $p_5$, $P_6$ which define the pronunciation of the location name "Compiégne".

Thus, this message is "motorway A1 to Lille traffic jam over two kilometres at the area of Compiégne".

In the present example the symbols represent a content of a basic memory unit, for example $c_1$, represented by 16 bits, which could have the value 327, and not the characters "c" and "1". The three symbols $P_1$, $P_2$, $p_3$ represent three successive values, for example by way of 8 bits each.

The microcontroller 7 is connected, via a serial bus 11 of, for example the I2C type, to the speech synthesizer module 20 for the supply of symbol sequences as described above. The bus 11 thus utilizes the procedures which are known for a I2C bus (inter alia the starting and finishing procedure) and the I2C message transmitted thereby is formed by a series of symbols such as illustrated in FIG. 3.

The speech synthesizer module 20 generates analog signals for the audio amplifier 4 succeeded by the loudspeaker 5. It comprises inter alia:

a volatile memory 17, being a so-called "RAM", inter alia for the temporary storage of symbols arriving from the microcontroller 7, a permanent memory 16, for example a so-called "ROM", in which different useful data for the speech synthesizer module are stored, its own microcontroller 24, for example of the type 8051, which inter alia determines, on the basis of symbol sequences received via the bus 11, the contents of the message to be produced and produces, in order to obtain ultimately an analog signal intended for the audio amplifier, successive amplitude samples of this analog signal at a sampling rate of, for example 8 kHz, a digital-to-analog converter 6 which receives said samples one by one and generates the analog signal for the audio amplifier 4.

When a message arrives on the bus 11, the message begins with a type recognition character. The type recognition character designates a part of the memory 16 containing software for interpreting the symbols succeeding the type recognition character. For example, the type recognition character $ designates software capable of using the symbol "A1". When it encounters a type recognition character, the microcontroller sets a flag which signifies that there is a given type, said flag being reset when the same type recognition character is encountered again, the next symbol in the message then again being a type recognition character.

In the case of the type recognition character ^, the subsequent symbols are describers of phonemes. Each of these symbols leads to an address at which the microcontroller finds indications enabling it to form, in known manner, the successive amplitude samples of the amplitude of the analog signal to be produced. A single phoneme corresponds to each symbol.

In the case of the type recognition character |, a single symbol follows, it is a number designating a phrase or at least a complete element of a phrase. This information again leads to an address at which the microcontroller finds directly the successive amplitude samples of the analog signal to be produced. For example, the data $C_2$ leads to the reproduction of the words "traffic jam", the data $C_3$ to that of the words "for two kilometres", etc. Several phonemes correspond to each symbol.

In the case of the type recognition character $, the subsequent data designate a number or a major route. The interpretation software analyses the complete contents of the data; for example, in the case of the data "A1", first the element A is analysed and subsequently the element 1. It then successively determines an address at which it directly finds the successive amplitude samples of the analog signal, corresponding to the reproduction "motorway A" (which means that it is designated by the data "A") and subsequently an address at which it finds those corresponding to the reproduction "one" (which means that it is designated by the data "1"). The interpretation software is specific, because it comprises an analysis module which is known per se and which serves to decompose a number into various elements in conformity with arithmetical rules. For example, the sequence of symbols $223$ does not yield the reproduction "two", "two", "three", but "two", "hundred", "twenty" "three".

We claim:

1. A traffic information apparatus, comprising:

a speech synthesizer for generating spoken messages in the form of analog audio signals;

a memory for storing a data element representing a spoken message element corresponding to each of a multiplicity of different codes of a first type and for storing a data element representing a spoken message element corresponding to each of a multiplicity of different codes of a second type, each said code of the first type corresponding to a phonetic element of a word and each said code of the second type corresponding to a sequence of one or more complete words;

a microcontroller for receiving a group of the codes representing a complete spoken message and for interpreting the received codes so as to locate and fetch the data elements in the memory that correspond to the received codes;

the microcontroller preceding each fetched data element corresponding to a code of the first type with a predetermined first type recognition character and preceding each fetched data element corresponding to a code of the second type with a predetermined second type recognition character different from the first type recognition character and sending the fetched data elements and preceding type recognition characters to the speech synthesizer;

the speech synthesizer including means for recognizing the type recognition characters and for transforming each data element following a first type recognition character into a phonetic element of a word in analog audio signal form and for transforming each data element following a second type recognition character into one or more complete words in analog audio signal form.

2. A traffic information apparatus as claimed in claim 1 wherein the codes of the first type are numbers, each representing a prestored phonetic element in another memory located in the speech synthesizer.

3. A traffic information apparatus as claimed in claim 1 wherein said codes of the second type are numbers, each representing a prestored sequence of one or more complete words in another memory located in the speech synthesizer.

4. A traffic information apparatus as claimed in claim 1 wherein said codes of the second type are numbers, each representing a quantity or designation of a major route, said speech synthesizer comprising means for transforming each data element of the second type into one or more complete words that include the represented quantity or designation of a major route.

5. A traffic information apparatus as claimed in claim 1, wherein the memory also is for storing a data element representing a spoken message element corresponding to each of a multiplicity of different codes of a third type, the microcontroller preceding each fetched data element corresponding to a code of the third type with a predetermined third type recognition character different from said first and second type recognition characters.

6. A traffic information apparatus as claimed in claim 1, wherein the microcontroller sends the fetched data elements and preceding type recognition characters for the complete spoken message to the speech synthesizer one after the other by means of a single data transfer via a serial bus.

7. A traffic information apparatus as claimed in claim 6, wherein the serial bus is of the I2C type.

8. A traffic information apparatus as claimed in claim 6, wherein the microcontroller also follows each fetched data element with a type recognition character identical to the type recognition character that precedes said each fetched data element.

9. A module for generating traffic information messages, intended to be connected to a speech synthesizer which generates spoken message in the form of audio signals of the analog type, comprising:

- a memory for storing a data element representing a spoken message element corresponding to each of a multiplicity of different codes of a first type and for storing a data element representing a spoken message element corresponding to each of a multiplicity of different codes of a second type, each said code of the first type corresponding to a phonetic element of a word and each said code of the second type corresponding to a sequence of one or more complete words;
- a microcontroller for receiving a group of the codes representing a complete spoken message and for interpreting the received codes so as to locate and fetch the data elements in the memory that correspond to the received codes;
- the microcontroller preceding each fetched data element corresponding to a code of the first type with a predetermined first type recognition character and preceding each fetched data element corresponding to a code of the second type with a predetermined second type recognition character different from the first type recognition character and sending the fetched data elements and preceding type recognition characters to a speech synthesizer.

10. A module for generating traffic information messages as claimed in claim 9, wherein the memory also is for storing a data element representing a spoken message element corresponding to each of a multiplicity of different codes of a third type, the microcontroller preceding each fetched data element corresponding to a code of the third type with a predetermined third type recognition character different from said first and second type recognition characters.

11. A speech synthesizer module intended for use in a traffic information apparatus, comprising

- means for the acquisition of data representing a respective message element,
- a permanent memory in which audio signals of the analog type are stored in the form of a digital sample, corresponding to a respective one of said data,
- a microcontroller which comprises means for processing said data so as to find in the memory the corresponding audio signals, characterized in that
- the microcontroller comprises means
  - for recognizing several different types of data,
  - for processing these data in conformity with their type and for finding the corresponding audio signals in the memory.

12. A speech synthesizer module as claimed in claim 11, characterized in that it comprises means for recognizing and processing respective data formed by a number which designates a symbol representing the phonetic transcription of a message element.

13. A speech synthesizer module as claimed in claim 11, characterized in that it comprises means for recognizing and processing respective data formed by a number which designates a prestored sequence in a memory, which sequence corresponds to a phrase part.

14. A speech synthesizer module as claimed in claim 11, characterized in that it comprises means for recognizing and processing respective data formed by a number which designates a quantity or the designation of a major route.

15. A speech synthesizer module as claimed in claim 11, characterized in that it comprises means for recognizing and processing at least three different types of data.

16. A speech synthesizer module as claimed in claim 11, characterized in that it comprises means for receiving data of different types, constituting a complete message, said data being mixed one after the other in a single transfer of data via a serial bus.

* * * * *